(12) United States Patent
Baugh

(10) Patent No.: US 7,775,233 B2
(45) Date of Patent: Aug. 17, 2010

(54) CHOKE OR INLINE VALVE

(75) Inventor: John Lindley Baugh, College Station, TX (US)

(73) Assignee: Baker Hughes Incorporated, Houston, TX (US)

( * ) Notice: Subject to any disclaimer, the term of this patent is extended or adjusted under 35 U.S.C. 154(b) by 651 days.

(21) Appl. No.: 11/724,527

(22) Filed: Mar. 15, 2007

(65) Prior Publication Data

US 2008/0224076 A1  Sep. 18, 2008

(51) Int. Cl.
*F16K 1/12* (2006.01)
(52) U.S. Cl. .................................. 137/219; 138/46
(58) Field of Classification Search ................. 137/219; 252/61, 61.1; 138/93, 46; 251/120, 121, 251/123
See application file for complete search history.

(56) References Cited

U.S. PATENT DOCUMENTS

| | | | | |
|---|---|---|---|---|
| 2,917,269 A * | 12/1959 | Welker | ............... | 251/63.5 |
| 3,746,300 A * | 7/1973 | Welker | ............... | 251/63.5 |
| 3,995,694 A | 12/1976 | Freiburger | | |
| 4,117,859 A * | 10/1978 | Illy | ............... | 137/219 |
| 4,137,933 A * | 2/1979 | Culpepper | ............... | 137/219 |
| 4,799,647 A * | 1/1989 | Cook et al. | ............... | 251/356 |
| 5,119,861 A * | 6/1992 | Pino | ............... | 138/89 |
| 5,186,431 A | 2/1993 | Tamari | | |
| 5,333,916 A * | 8/1994 | Burkit et al. | ............... | 285/97 |
| 5,344,284 A * | 9/1994 | Delvaux et al. | ............... | 415/173.2 |
| 5,836,353 A | 11/1998 | Van Steenwyk | | |
| 6,213,144 B1 * | 4/2001 | Moore | ............... | 137/219 |
| 6,896,049 B2 | 5/2005 | Moyes | ............... | 166/82.1 |
| 7,353,837 B2 * | 4/2008 | Biester | ............... | 137/219 |

FOREIGN PATENT DOCUMENTS

WO    2006078622 A2    7/2006

OTHER PUBLICATIONS

International Search Report and Written Opinion Mailed Feb. 2, 2009, Written Opinion 3 Pages, Search Report 5 Pages.
Schlumberger; "ACV-12 Adjustable Choke Valves"; Jul. 2003; 2 PGS.
Schlumberger; "ACV-5 Adjustable Choke Valves"; Jul. 2003; 2 PGS.
Schlumberger; "ACV-8 Adjustable Choke Valves"; Jul. 2003; 2 PGS.
Schlumberger; "Positive Inline Choke"; Jul. 2003; 1 PG.
Schlumberger; "Electric Actuators"; Jul. 2003; 1 PG.

* cited by examiner

*Primary Examiner*—John Rivell
*Assistant Examiner*—Craig M Schneider
(74) *Attorney, Agent, or Firm*—Cantor Colburn LLP

(57) ABSTRACT

Disclosed herein is an inline valve. The inline valve includes, a housing, a choke member in operable communication with the housing, a portion of the choke member being substantially immobile relative to the housing and a portion of the choke member being mobile relative to the housing. The inline valve further includes, an actuator in operable communication with the movable portion of the choke member, the actuator selectively causing the choke member to deform radially.

31 Claims, 2 Drawing Sheets

CHOKE OR INLINE VALVE

BACKGROUND

In the course of the production of target fluids from a well, control of the rate of flow (of target or non-target fluids) is an important consideration. Such control is useful for a number of reasons such as maintaining a production rate that is desirable for any number of reasons, maintaining a rate of production that minimizes flow cutting of well equipment, controlling undesirable rates of fluid exodus from the well or even to shut the well in. Sliding sleeves, safety valves and a host of other valves others are known to the art to control all kinds of properties in all kinds of conditions. Each type of valve has strengths and weaknesses ranging from temperature or flow cut vulnerabilities to where in the well they are physically installable relative to where in the particular well would be an optimal position. Even in view of the many types of valves already at the disposal of well operators, however, there is need for new and different valve configurations to support otherwise undersupported situations.

As well technology continues to advance and configurations of wells change, the above noted need grows. Therefore new valve configurations are a consistently useful addition to the well operator's repertoire.

SUMMARY

Disclosed herein is an inline valve. The inline valve includes, a housing, a choke member in operable communication with the housing, a portion of the choke member being substantially immobile relative to the housing and a portion of the choke member being mobile relative to the housing. The inline valve further includes, an actuator in operable communication with the movable portion of the choke member, the actuator selectively causing the choke member to deform radially.

Further disclosed herein is a method of choking a tubular. The method includes, energizing an actuator in operable communication with a movable portion of a choke member, moving the movable portion relative to a substantially immobile portion of the choke member thereby causing a choke segment of the choke member to change a radial dimension thereof and choking an available flow area with the change in the radial dimension of the choke segment.

BRIEF DESCRIPTION OF DRAWINGS

Referring now to the drawings wherein like elements are numbered alike in the several Figures.

DETAILED DESCRIPTION

Figure 1:
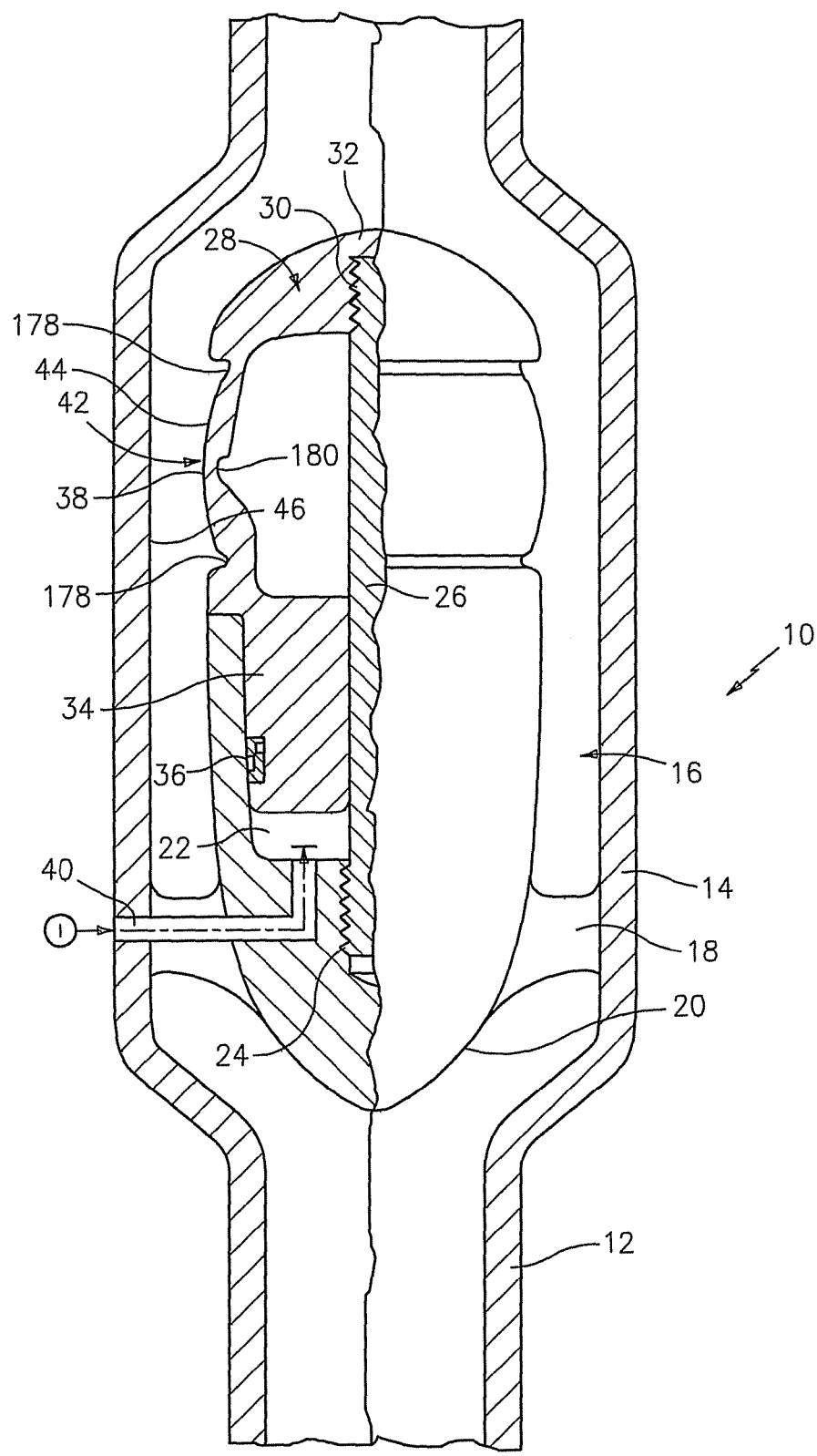
FIG. 1 is a schematic cross section of an inline shut off valve and system.

Referring to FIG. 1, an inline shut off valve system 10 is depicted schematically in cross section. The system 10 includes both a tubular 12 having an enlarged portion 14 and a valve 16 disposed in the enlarged portion 14 of the tubular 12. The tubular 12 includes one or more support(s) 18 to retain valve 16 in the portion 14. In one embodiment, the flow area in tubular 12 is the same whether downhole, at or uphole of the valve 16.

Turning to valve 16 of the system 10, the valve includes a housing 20 that is fixed to the support(s) 18. Housing 20 defines a chamber 22 and a threaded receptacle 24 to receive a fixing rod 26. The fixing rod 26 fixes a choke member 28 to the housing 20 with as illustrated another threaded connection 30. It will be appreciated that the threads on fixing rod 26 are only one means of fixing that is possible. The purpose of the fixing rod is to maintain housing 20 and a cap 32 of choke member 28 at either a relatively or fully fixed distance from one another. Any fastening method at the ends of fixing rod 26, such as threading, welding, adhering, pinning, interference fitting, etc. is acceptable.

The choke member 28 further includes a piston body 34 having a pressure seal 36 such as an o-ring disposed thereat to seal between the piston body and the housing 20. Finally choke member 28 includes a choke segment 38. The choke segment 38 is responsive to movement of the piston body 34 in a direction toward the top of the drawing, which is occasioned by an increase in fluid pressure in chamber 22. Fluid may be increased in chamber 22 either by the application of pressure through a conduit 40, such as illustrated, or if the chamber 22 is sealed (temporarily or permanently) by pressure buildup due to heat energy input. In either case, pressure in chamber 22 causes piston body 34 to move closer to cap 32 which in turn causes choke segment 38 to bulge radially outwardly at an axial center thereof indicated by arrow 42. The greater the pressure in chamber 22, the larger the radial growth of segment 38 until an outer surface 44 thereof contacts an inside wall 46 of tubular 12. Once contact as such is made, a significant restriction to flow is achieved. In some cases, flow is completely eliminated, in which case the choke member acts as a seal member.

Additionally, the radial deformation of the choke segment 38 is reversible such that an amount of choke is controllable. The reversibility is achieved by reducing pressure in the chamber 22 through the conduit 40, such as illustrated, or if the chamber 22 is sealed (temporarily or permanently) by pressure reduction due to heat energy removal. In either case, a reduced pressure in chamber 22 causes piston body 34 to move further from the cap 32 which in turn causes the choke segment 38 to reduce radially. Radial reduction of the choke segment 38 causes a decrease in the level of choking.

Figure 2:
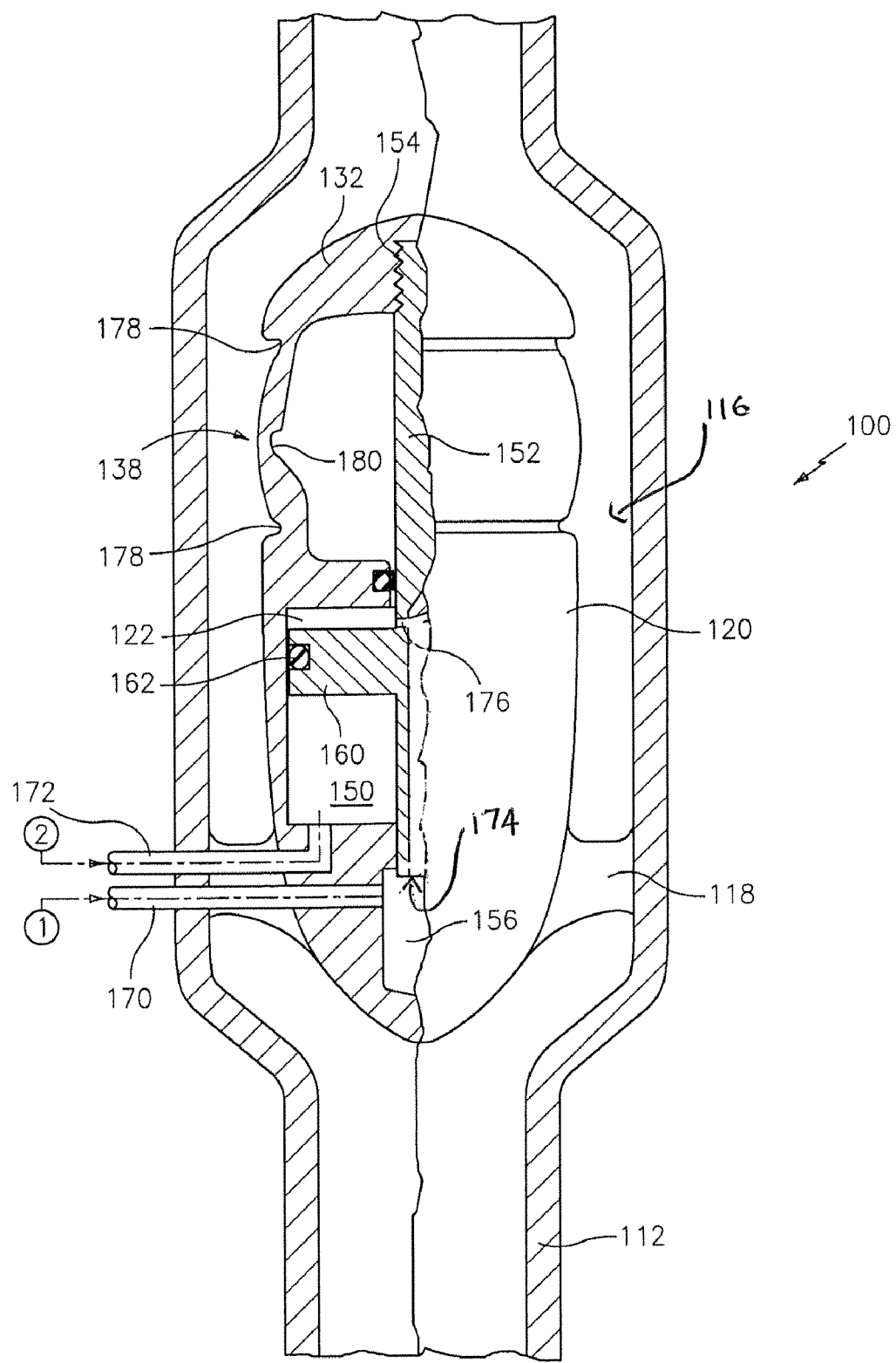
FIG. 2 is a schematic cross section of an inline choke and system.

In another embodiment utilizing the concept hereof, and referring to FIG. 2, an adjustable choke 100 is disclosed. A tubular 112 is identical to the tubular in the foregoing embodiment as are one or more support(s) 118. Focus therefore will be on a valve portion 116. A housing 120 is quite distinct in this embodiment as the housing 120 itself comprises a choke segment 138 and actuation of this choke segment 138 is through urging of a cap 132 toward a bottom of the drawing FIG. 2 rather than an actuation involving fixing the location of cap 32 relative to housing 20, as in FIG. 1. Here the impetus to choke is due to the movement of cap 132 occasioned by fluid pressure being directed to a chamber 122 for opening of the choke 100 or a chamber 150 to close choke 100.

The mechanism for this operation is a movable rod 152 threadly, or otherwise fixed, at affixation 154 to cap 132 and slidably receivable in recess 156 of housing 120. The movable rod 152 includes a piston 160 having a seal 162 in pressure sealing slidable communication with housing 120. Thus the rod can be urged to choke or open the valve 116. As one of skill in the art should be aware from the drawing, the piston 160 is annular in the illustrated embodiments. A pressure inlet 170 functions to close the choke while a pressure inlet 172 functions to provide opening pressure for the valve 116. It is to be appreciated that when each of these inlets is not functioning to receive applied pressure, they will function to receive exhausted fluid from the chamber of valve 116 not being pressurized. For clarity of disclosure, the fluid path from 170 into chamber 122 is sequentially from inlet 170 to recess 156 to an opening 174 in rod 152, to a port (or number of ports) 176 in rod 152 and thus into chamber 122. As is evident from FIG. 2, the fluid path for chamber 150 is straightforward.

Returning now to operation of the embodiment of FIG. 2, pressure applied to chamber 122 causes piston 160 to move toward a bottom of FIG. 2, consequently moving rod 152 at cap 132 in the same direction. This motion causes an axial compression stress on the choke segment 138, which is predisposed to deform radially outwardly. As the stress continues to rise pursuant to fluid accumulation in chamber 122, the choke segment 138 will move into contact with the tubular 112 to seal it off. It is to be appreciated that the device is variable in its degree of actuation so that the amount of deformation is selectable. This allows the valve 116 to operate at anywhere from a full open position to a choked position to a fully closed position. Choking can be at whatever amount of choke is desired as the volume of fluid in 122 can be selected, thus the amount of radial deformation can be controlled.

In both embodiments described herein, the choke segment is described as being predisposed toward radially outward deformation. This predisposition can be caused by constructing the choke segment to have a reverse hourglass shape so that axial stress thereon will continue to deform the segment in the same direction. The material of the segment, so configured, may be any deformable material such as metal or elastomer, however metal seals will provide higher resistance to downhole conditions such as erosion for example. Additionally, the choke segment may be coated with a material that resists erosion of the choke segment.

Alternatively, the choke segment of either described embodiment may take the form of cylindrical bodies having lines of weakness therein to predispose the choke segment to deform in a selected direction. One form of lines of weakness are shown in FIGS. 1 and 2 hereof as grooves. In the embodiments described, there are two lines of weakness 178 at an outside dimension of the segment 38/138 and one line of weakness 180 at the inside dimension thereof. Upon compressive axial stress, the grooves close upon themselves making the seal move to an actuated position. A full disclosure of this type of sealing configuration is found in U.S. Pat. No. 6,896,049, which is incorporated herein in its entirety by reference.

It is to be appreciated that although the figures both illustrate the choke segments actuating radially outwardly, it is equally possible to reverse components of the disclosed devices thereby causing the choke segment to actuate inwardly while maintaining the same overall function, the caveat being that in such arrangement, the flow area would be annular and radially inwardly of the choke segment. It should further be noted that although fluid pressure is specifically described and shown herein as the prime mover for actuation, it is additionally possible to utilize a motor operably connected to the choke segment such as, for example with respect to FIG. 2, a ball nut spinnable by motor to draw the rod 152 toward the bottom of FIG. 2 thereby creating the axial compressive stress on the choke segment will function equally well. Since schematically illustrated motor appears as does the recess 156 Applicant refers to 156 of FIG. 2 to represent the motor for this embodiment.

While preferred embodiments have been shown and described, modifications and substitutions may be made thereto without departing from the spirit and scope of the invention. Accordingly, it is to be understood that the present invention has been described by way of illustrations and not limitation.

The invention claimed is:

1. An inline valve comprising:
   a housing;
   a metal choke member in operable communication with the housing, a portion of the choke member being substantially immobile relative to the housing and a portion of the choke member being mobile relative to the housing, the choke member itself being interactive with a target tubular and having no other sealing member interposed between the metal choke member and the target tubular;
   an actuator in operable communication with the movable portion of the choke member, the actuator selectively causing the metal choke member to deform radially.

2. The inline valve as claimed in claim 1, wherein the choke member includes a fixed attachment to the housing.

3. The inline valve as claimed in claim 2, wherein the fixed attachment is a rod.

4. The inline valve as claimed in claim 2, wherein the fixed attachment is central of the inline valve.

5. The inline valve as claimed in claim 1, wherein the choke member is in pressure sealed communication with the housing.

6. The inline valve as claimed in claim 5, wherein the pressure sealed communication is a piston arrangement where the piston is connected to the movable portion of the choke member, the piston being movable within the housing.

7. The inline valve as claimed in claim 6, wherein the piston is connected to the choke member such that a choke segment of the choke member deforms upon movement of the piston.

8. The inline valve of claim 1, wherein the actuator is a pressure based actuator.

9. The inline valve as claimed in claim 1, wherein the actuator is a motor based actuator.

10. The inline valve of claim 1, wherein the choke member includes a choke segment that is predisposed to deform radially upon the application of an axial compressive force thereon.

11. The inline valve of claim 10, wherein the choke segment includes a plurality of lines of weakness.

12. The inline valve of claim 11, wherein the lines of weakness are positioned to create a selected profile upon deformation.

13. The inline valve of claim 11, wherein the lines of weakness are grooves.

14. The inline valve of claim 11, wherein the lines of weakness number three and are positioned two on an outside dimension of the choke segment and one on the inside dimension of the choke segment.

15. The inline valve of claim 10, wherein the choke segment is reverse hourglass shaped.

16. The inline valve of claim 10, wherein the choke segment is metal.

17. The inline valve of claim 1, wherein the movable portion of the choke member is central to the choke member.

18. The inline valve of claim 17, wherein the choke member is fixedly connected to a central attachment operable with the housing.

19. The inline valve of claim 18, wherein the central attachment is actuated by the actuator to urge the choke member in a direction calculated to cause radial deformation of a choke segment of the choke member.

20. The inline valve of claim 1, wherein the actuator includes two hydraulic inlets, one for actuation in each of two directions.

21. The inline valve of claim 19, wherein the attachment includes a piston reactive to applied fluid pressure to move the choke member.

22. The inline valve as claimed in claim 1, wherein the choke member is a permanent barrier for well abandonment.

23. A method of choking a tubular, comprising:

energizing an actuator in operable communication with a movable portion of a metal choke member;

moving the movable portion relative to a substantially immobile portion of the choke member causing a metal choke segment of the choke member to change a radial dimension thereof; and choking an available flow area with the change in the radial dimension of the choke member, the choke member itself being interactive with the tubular and having no other sealing member interposed between the metal choke member and the tubular.

24. The method of choking a tubular of claim 23, wherein the energizing further comprises pressurizing a chamber to move a piston in operable communication with the movable portion.

25. The method of choking a tubular of claim 24, wherein the pressurizing a chamber further comprises building pressure through heat energy input.

26. The method of choking a tubular of claim 23, wherein the energizing further comprises rotating a motor.

27. The method of choking a tubular of claim 23, wherein the radial dimensional change of the choke segment is a radial increase and the choking is between the radial increase of the choke segment and an inner wall of the tubular.

28. The method of choking a tubular of claim 27, wherein the choking further comprises sealing the choke segment to the inner wall of the tubular.

29. The method of choking a tubular of claim 23, wherein the choking of the flow area is reversible.

30. The method of choking a tubular of claim 23, wherein the choke member is made of an erosion resistant material.

31. The method of choking a tubular of claim 23, wherein the choke member is coated with an erosion resistant material.

* * * * *